United States Patent [19]

DeKoe et al.

[11] 3,745,535

[45] July 10, 1973

[54] MODULAR SYNCHRONOUS BUFFER UNIT FOR A BUFFER HAVING A CAPACITY DEPENDING ON THE NUMBER OF INTERCONNECTED IDENTICAL BUFFER UNITS

[75] Inventors: Oscar Bernardus Philomenus Rikkert DeKoe; Arnold Jan Bijker, both of Emmasingel, Eindhoven, Netherlands

[73] Assignee: U.S. Philips Corporation, New York, N.Y.

[22] Filed: Oct. 5, 1971

[21] Appl. No.: 186,705

[30] Foreign Application Priority Data

Oct. 8, 1970 Netherlands ........................ 7014737

[52] U.S. Cl. .......................... 340/172.5, 307/221 R

[51] Int. Cl. ........................................ G11c 19/00

[58] Field of Search .................. 340/172.5, 174 SR; 307/221 R; 328/37

[56] References Cited

UNITED STATES PATENTS

| | | | |
|---|---|---|---|
| 3,540,004 | 11/1970 | Hansen | 340/172.5 |
| 3,643,221 | 2/1972 | Chambers | 340/172.5 |
| 3,274,566 | 9/1966 | McGrogan, Jr. | 340/172.5 X |
| 3,388,383 | 6/1968 | Shivdasani et al. | 340/172.5 |
| 3,543,243 | 11/1970 | Nordquist | 340/172.5 |
| 3,543,247 | 11/1970 | Schrem | 340/172.5 |
| 3,585,604 | 6/1971 | Lloyd | 340/172.5 |
| 3,659,274 | 4/1972 | Kyser | 340/172.5 |

*Primary Examiner*—Paul J. Henon
*Assistant Examiner*—Melvin B. Chapnick
*Attorney*—Frank R. Trifari

[57] ABSTRACT

A synchronous buffer unit module which includes a shift register, a bookkeeping register and two clock pulse selectors. An internal clock pulse generator operates at a frequency *n* times the average frequency of information input and information output devices. The shift register contains n stages each controlled by an output of the bookkeeping register. During the period when information is stored in the shift register the bookkeeping register is controlled selectively either by a combination of the internal clock pulses and the clock pulses of an external information source through one of the clock pulse selectors, or in the case where the unit forms a buffer stage subsequent to the first buffer stage of a buffer assembly by pulses from the last stage of the bookkeeping register in a preceeding buffer unit. During the output period of the buffer unit the bookkeeping stage is controlled through a second clock pulse selector by the internally generated clock pulses and the clock pulses from an external unit to which the information in the buffer is to be transmitted or, in the case where the unit preceeds the last unit in a buffer assembly of such buffer units, by a signal derived from the first stage of a bookkeeping memory in the next subsequent buffer unit.

1 Claim, 4 Drawing Figures

INVENTORS
OSCAR B. PH. RIKKERT DE KOE
ARNOLD J. BIJKER

BY [signature]
AGENT

INVENTORS
OSCAR B. PH. RIKKERT DE KOE
ARNOLD J. BIJKER
BY
AGENT

MODULAR SYNCHRONOUS BUFFER UNIT FOR A BUFFER HAVING A CAPACITY DEPENDING ON THE NUMBER OF INTERCONNECTED IDENTICAL BUFFER UNITS

The invention relates to a synchronous buffer unit comprising a register composed of a plurality of sections. The register is coupled to an information input and output terminal for supplying information to the buffer unit and for transmitting information from the buffer unit. The information is temporarily stored in the register. The information has a given clock pulse frequency. Supply terminals are provided for supplying the clock pulses of the information to be written in or read out of the buffer.

A synchronous buffer unit of this kind, where the information supplied to the input terminal is serially written in the consecutive sections of the register and the information is serially read from the consecutive sections and applied to the information output terminal, is generally known and is used inter alia for coupling digital telephone and data transmission systems. These transmission systems operate at clock pulse frequencies which are equal on the average, but which may be unequal at any given instant due to the occurrence of phase variations, caused, for example, by delay time variations in the transmission systems.

The known buffer unit is provided with selection units and counters for writing information in and reading information out of the consecutive sections of the register. These selection devices and counters successively connect, under the control of clock pulses of the information to be written in or read out, the information input terminal or output terminal, respectively, to the consecutive sections of the register. These selection units and counters are rather bulky. This is particularly so if the difference of the clock pulse frequencies of the transmission systems between which the buffer unit is provided may be large at any given instant. In that case a buffer unit having a large storage capacity is required, i.e., a buffer unit comprising a register having a large number of sections, the selection units and the counters thereof being accordingly bulky.

One object of the invention is to provide a buffer unit which is less bulky, in particular in the case of a large storage capacity, and which can be readily realized for achieving a large storage capacity by series connection of two or more buffer units having a smaller storage capacity. Another object of the invention is to realize a buffer unit having a structure of a frequently recurrent nature, so that the buffer unit can be assembled mainly from one kind of logical component.

The unit according to the invention is characterized in that the register is a shift register, each section of which is provided with a control terminal for supplying shift pulses, and a series of bistable elements is provided, the bistable elements and the sections of the shift register being associated with each other in a one-to-one relationship. Each bistable element is provided with two signal inputs, one clock pulse input and two signal outputs, which are inverse to each other. The clock pulse inputs of which are connected to a clock pulse connection terminal for supplying thereto clock pulses having a clock pulse repetition frequency which amounts to more than double the clock pulse frequency of the information to be written in or read out. A first clock pulse selector is coupled to the clock pulse connection terminal, and the supply terminal for the clock pulses of the information to be written in, and a signal input of the first bistable element of the said series for the non-recurrent setting of the first bistable element of the said series within each clock pulse period of the information to be written in. A signal output of each bistable element is connected to a signal input of the subsequent bistable element for setting, under the control of the clock pulses applied to the clock pulse connection terminals, the said non-set subsequent bistable element when the said each bistable element has been set. The other signal input of each bistable element is connected to the other signal output of the subsequent bistable element for resetting the said set each bistable element when the said subsequent bistable element is in the reset state. The said other signal output of each bistable element is also connected to the control terminal of the associated section of the shift register so as to supply thereto a shift pulse when the bistable element is set. A second pulse selector is coupled to the clock pulse connection terminal, and to the information supply terminal for the clock pulses of the information to be read out, and the said other signal input of the last bistable element of the said series for the non-recurrent resetting of the last bistable element of the said series within each clock pulse period of the information to be read out.

In this context it is also to be noted that an asynchronous buffer unit is known which also uses a shift register for the temporary storage of information. These units are, however, less reliable as they impose requirements as regards the pulse duration of the clock pulses of the information to be written in and read out, respectively.

BRIEF DESCRIPTION OF THE DRAWING

In order that the invention may be readily carried into effect, some embodiments thereof will now be described in detail, by way of example, with reference to the accompanying diagrammatic drawings, in which.

DESCRIPTION OF THE PREFERRED EMBODIMENT

Figure 1:
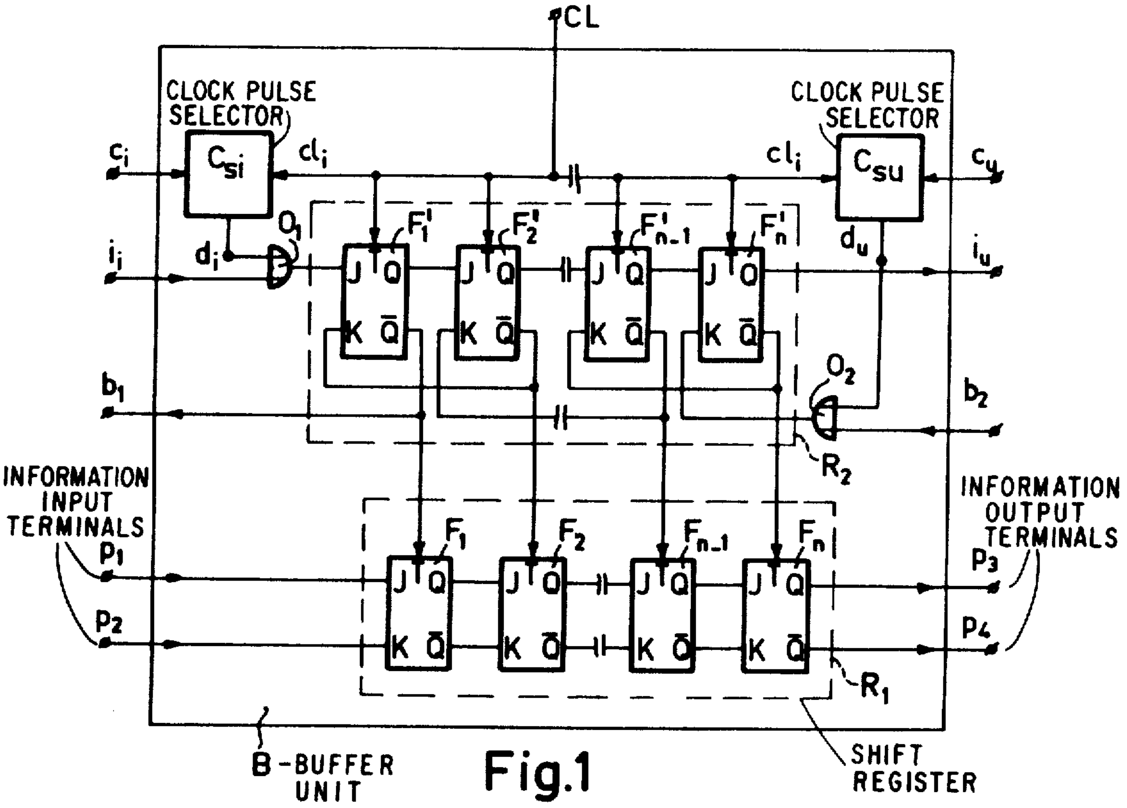
FIG. 1 shows an embodiment of a buffer unit according to the invention.

The unit shown in FIG. 1 comprises a register $R_1$ which is comprised of, for example, $n$ sections $F_1$ to $F_n$, said register $R_1$ being provided with information input terminals $p_1$ and $p_2$ and information output terminals $p_3$ and $p_4$. The sections $F_1$ to $F_n$ are formed by bistable elements which are used for the temporary storage of information. For writing information in or reading information from these sections, a known unit comprises two selection networks and two counters. A first selection network is connected between the information input terminals $p_1$ and $p_2$ and the inputs of the sections $F_1$ to $F_n$. Under the control of the clock pulses of the information to be written in, the first selection network connects Csi, by means of a first counter and the information input terminals $p_1$ and $p_2$, successively to the input terminals of the consecutive sections $F_1$ to $F_n$ of the register $R_1$. The counter stores the identity of the section in which the last information has been written. After having reached the highest counting position, this counter always returns to its starting position, after which the register $R_1$ is written in again. The second selection network is connected between the outputs of the sections $F_1$ to $F_n$ and the information outputs $p_3$ and $p_4$. Under the control of the clock pulses of the information $C_u$ to be read out, this selection network successively connects the information output terminals $p_3$ and $p_4$ to the output terminals of the consecutive sections $F_1$ to $F_n$ of the register $R_1$ by means of the second counter. The second counter stores the identity of the section from which the last information has been read. This counter also returns to the starting position after reaching its highest counting position. As the register $R_1$ comprises $n$ sections, the largest phase difference which can occur between information to be written in and information to be read out corresponds to $n$ clock pulse periods.

In transmission systems in which the phase difference between the information to be written in and read out can be very large at any given instant, a register having a large number of sections is to be used, and hence the selection networks and the counters are large, which results in a bulky buffer unit.

The concept of the unit according to the invention essentially differs from this known device in that the register $R_1$ is a shift register. In addition each section $F_1$ to $F_n$ of the shift register is provided with a control terminal T for supplying shift pulses thereto. A series $R_2$ of bistable elements $F_1'$ to $F_n'$ is provided. The bistable elements $F_1'$ to $F_n'$ and the sections $F_1$ to $F_n$ of the shift register $R_1$ associated with each other in a one-to-one relationship. Each of said bistable elements is provided with two signal inputs J and K, respectively, one clock pulse input T and two signal outputs Q and $\bar{Q}$, respectively, which are inverse to each other. The clock pulse inputs T are connected to a clock pulse connection terminal CL for supplying thereto clock pulses $cl_i$ having a clock pulse repetition frequency $f_{CL}$ amounting to more than double the clock pulse frequency of the information to be written in or read out. A first clock pulse selector $C_{si}$ is coupled to the clock pulse connection terminal CL, and the supply terminal for the clock pulses of the information $C_i$ to be written in, and a signal input J of the first bistable element $F_1'$ of the said series for the non-recurrent setting of the first bistable element $F_1'$ of the said series within each clock pulse period of the information to be written in signal output Q of each bistable element $F_1'$ to $F_{n-1}'$ is connected to a signal input J of the subsequent bistable element $F_2'$ to $F_n'$ for setting, under the control of the clock pulses $cl_i$, the said non-set subsequent bistable element $F_2'$ to $F_n'$ when the said each bistable element $F_1'$ to $F_{n-1}'$ has been set. The other signal input $\bar{Q}$ of each bistable element $F_1'$ to $F_{n-1}'$ is connected to the other signal output K of the subsequent bistable element $F_2'$ to $F_n'$ for resetting each bistable element $F_1'$ to $F_{n-1}'$ when the said subsequent bistable element $F_2$ to $F_n$ is in the reset state. The other signal output $\bar{Q}$ of each bistable element $F_1'$ to $F_n'$ also is connected to the control terminal T of the associated section $F_1$ to $F_n$ of the shift register $R_1$ for supplying thereto a shift pulse when the bistable element $F_1'$ to $F_n'$ has been set. A second clock pulse selector $C_{su}$ is coupled to the clock pulse connection terminal CL and to the supply terminal $C_u$ for the clock pulses of the information to be read out, and the said other signal input K of the last bistable element $F_n'$ of the said series for the nonrecurrent resetting of the last bistable element $F_n'$ of the said series within each clock pulse period of the information to be read out.

The sections $F_1$ to $F_n$ of the shift register $R_1$ as well as the bistable elements $F_1'$ to $F_n'$ of the series $R_2$ shown in FIG. 1, are constructed as master-slave storage elements of the J-K type having information inputs J and K, a control pulse input T and also information outputs Q and $\bar{Q}$ which are inverse with respect to each other. The contents of each storage element are characterized in the set state by the logical value "1" and by the logical value "0" of the information output Q in the reset state.

As is known, the contents of the said master-slave storage element are determined, after the appearance of the control pulse on the control pulse input T, by the logical values of the information inputs J and K and the information output Q prior to the appearance of a control pulse.

Prior to the appearance of a control pulse, the logical values of the information inputs $J$ and $K$ and the information output $Q$ of an element $F_g$ can be mathematically represented by $J_{g,t}$, $K_{g,t}$, $Q_{g,t}$, respectively. The logical values of the information output $Q$ of an element $F_g$ after the appearance of a control pulse can be mathematically represented by $Q_{g,\,t+d}$. The relation between $Q_{g,t+d}$, $J_{g,t}$, $K_{g,t}$ and $Q_{g,t}$ of a master-slave storage element of the J-K type can be represented by the boolean expression $$Q_{g,t+d} = Q_{g,t}\,\bar{K}_{g,t} + \bar{Q}_{g,t}\,J_{g,t} \tag{1}$$

In order to obtain a shift register which is used for the temporary storage of information, the information output $Q_{g-1}$ of a section $F_{g-1}$ ($g$=2, . . . $n$) is interconnected in known manner to the information input $J_g$ of the subsequent section $F_g$ and the information output $\bar{Q}_{g-1}$ is interconnected to the information input $K_g$ of the subsequent section $F_g$.

It results that:

$$J_{g,t} = Q_{g-1,t} \tag{2}$$

and $$K_{g,t} = \bar{Q}_{g-1,t} \tag{3}$$

The logical values of the information output $Q_g$ after the appearance of a control pulse can, therefore, be expressed in the logical values of the information outputs $Q_g$, $Q_{g-1}$ and $\bar{Q}_g$ prior to the appearance of a control pulse, so $$Q_{g,t+d} = Q_{g,t}\,Q_{g-1,t} + \bar{Q}_{g,t}\,Q_{g-1,t} \tag{4}$$

It follows that, if the value of the information output $Q_{g-1,t}$ = "1" or $Q_{g-1,t}$ = "0", respectively, the value of the information output $Q_{g,t+d}$ will be "1" or "0", respectively, independent of the value of $Q_{g,t}$. Consequently, the information present on the information output $Q_{g-1}$ prior to the appearance of the control pulse will be present on the information output $Q_\theta$ after the appearance of the control pulse. Consequently, the register $R_1$ is a shift register. As a result, the information received on the information input terminals $p_1$ and $p_2$ will be shifted through to the information output terminals $p_3$ and $p_4$ under the control of control pulses applied to control terminals T of the bistable elements $F_1$ to $F_n$.

In order to ensure that the shift register $R_1$ acts as a store for the buffer unit B, the information present on the information input terminals $p_1$ and $p_2$ is to be written in in the rhythm of the clock pulse frequency of the received information, and the information which is present in section $F_n$ is to be read out of the clock pulse frequency of the transmission system to be connected. Moreover, is is to be avoided that information present in section $F_\theta$ of the shift register $R_1$ is destroyed by the information stored in the preceding section $F_{\theta-1}$.

For this purpose the clock pulse detectors $C_{st}$ and $C_{su}$, a series $R_2$ of bistable elements $F_1'$ and $F_n'$ and the clock pulse connection terminal CL are provided. The series $R_2$ of bistable elements $F_1'$ to $F_n'$ is used as a bookkeeping register for registering the sections of the shift register $R_1$ in which information is stored. By means of the sections of the shift register $R_1$ which are registered in the bookkeeping register and which contain information, the flow of information in the shift register $R_1$ is controlled at the clock instants of the clock pulses $cl_i$.

The bistable elements $F_1'$ to $F_n'$ of the series $R_2$ are associated with the bistable elements $F_1$ to $F_n$ of the shift register $R_1$ , and are also constructed as master-slave storage elements of the J-K type. For the purpose of distinction with respect to the J-K storage elements $F_1$ to $F_n$ of the shift register $R_1$, the inputs, outputs and the control pulse input of the J-K storage elements $F_1'$ to $F_n'$ of the series $R_2$ are referred to as signal inputs, signal outputs and clock pulse input.

The clock pulse input T of the bistable elements $F_1'$ to $F_n'$ are connected to the clock pulse connection terminal CL.

The signal outputs Q of the bistable elements $F_1'$ to $F_{n-1}'$ are connected to the signal inputs J of the elements $F_2'$ to $F_n'$. The signal outputs $\bar{Q}$ of the elements $F_2'$ to $F_n'$ are connected to the signal inputs *K* of the elements $F_1'$ to $F_{n-1}'$, so that for an element $F_\theta'$:

$$J_{\theta,t} = Q_{\theta-1,t} \qquad (5)$$

$$K_{\theta,t} = \bar{Q}_{\theta+1,t} \qquad (6)$$

The logical value of the signal output $Q_\theta$ after the appearance of a clock pulse on the clock pulse input T can be expressed, using (1), (5) and (6), in the logical values of the signal outputs $Q_\theta$, $Q_{\theta-1}$ and $Q_{\theta+1}$ prior to the appearance of a clock pulse, so that $$Q_{\theta,t+d} = Q_{\theta,t}\, Q_{\theta+1,t} + \bar{Q}_{\theta,t}\, Q_{\theta-1,t}.$$

It follows that when the value of $Q_{\theta,t}$ = "0" and hence the value of $\bar{Q}_{\theta,t}$ = "1," the value of $Q_{\theta,t+d}$ is determined exclusively by the value of $Q_{\theta-1,t}$. The value "0" of $Q_\theta$ will change to a value "1" after the appearance of a clock pulse only if $Q_{\theta-1}$ has the value "1." This means that the value "1" of a storage element is shifted through to the next storage element only if the next storage element has the value "0." In an anlogous manner, the value "1" of $Q_\theta$ after the appearance of a clock pulse changes to the value "0" only if $Q_{\theta+1}$ has the value "0," i.e., the value "1" of a storage element is changed to the value "0" if the subsequent storage element has the value zero.

As is shown in FIG. 1, the signal outputs $\bar{Q}$ of the bistable elements $F_1'$ to $F_n'$ of the series $R_2$ are connected to the control pulse inputs T of the sections $F_1$ to $F_n$ of the shift register $R_1$. In order to write information into the first section $F_1$ of the shift register $R_1$, the associated bistable element $F_1'$ of the series $R_2$ is set to the set-state "1," as will be described hereinafter. As a result, a positive going edge appears on output terminal Q, and a negative going edge appears on output terminal $\bar{Q}$. As already described, the bistable elements of the sections $F_1$ to $F_n$ are constructed so that at the trailing edge of the pulses applied to the control terminals T these elements are set in accordance with the signal values applied to the input terminals J and K, such that the information present on the information input terminals $p_1$ and $p_2$ is taken over by bistable element $F_1$. As the bistable element $F_1'$ is in the "1"-state, the next clock pulse $cl_i$ will set the bistable element $F_2'$ to the next "1"-state, if the bistable element $F_2'$ is in the "0"-state. The information present in section $F_1$ is written in section $F_2$ of the shift register $R_1$ by the trailing edge which is supplied by the bistable element $F_2'$ to the control pulse input T of the section $F_2$ of the shift register $R_1$ via the signal output $\bar{Q}$. The subsequently appearing pulse shifts the information from section $F_2$ to $F_3$ etc. in an identical manner. This shifting through of information at clock pulse instants continues for as long as the subsequent section of the shift register $R_1$ does not contain information. This is to say, as long as the bistable element of the series $R_2$ associated therewith is in the "0"-state. However, if the subsequent bistable element of the series $R_2$ is in the "1"-state, the "1"-state of the relevant element will not be shifted through, as described above, upon the next clock pulse, and no control pulse will appear on the control pulse input T of the subsequent section of the shift register.

In this manner it is achieved that, starting from a shift register which does not contain information, the first information bit written in passes through the shift register and is stored in section $F_n$, the second information bit is stored in section $F_{n-1}$, etc.

By setting the bistable element $F_n'$ to the "0"-state simultaneously with the reading out of information stored in the last section $F_n$ of the shift register $R_1$, as will be described hereinafter, the information from the last section but one $F_{n-1}$ will be shifted to the last section $F_n$ of the shift register by the first clock pulse appearing. The next clock pulse will shift the information from section $F_{n-2}$ to section $F_{n-1}$ etc.

The speed at which an information bit is shifted through the shift register $R_1$ as long as no information is present in the subsequent section, is equal to the clock pulse frequency of the clock pulses applied to the clock pulse connection terminal CL.

Due to the fact that the shifting of information under the control of the clock pulses $cl_i$ applied to the clock pulse connection terminal CL requires a given period of time, a given minimum storage capacity of the buffer unit B exists which is larger than zero. Assumming that, when information is continuously written in the shift register R each information bit reaching section $F_{n-1}$ can be written directly in the last section $F_n$ of the shift register $R_1$, $$(f_{in}/f_{CL}) \times n \text{ bits} \quad (7)$$

,rounded off to an integral number, are still present in the shift register. Therein, $f_{in}$ represents the clock frequency of the information to be written in, and $f_{CL}$ represents the clock frequency of the clock pulses $cl_l$ applied to the clock pulse connection terminal CL. This storage capacity is the minimum storage capacity of the buffer unit B.

If it is assumed that, when information is continuously read out of the shift register $R_1$, each time when the first section $F_1$ of the shift register $R_1$ is written in this information cannot be applied directly to $F_2$, the maximum storage capacity of the buffer unit is reached. This maximum storage capacity amounts to $$(1 - f_u/f_{CL})\ n \text{ bits} \quad (8)$$

, rounded off to an integral number, where $f_u$ is the clock pulse frequency of the information to be read out. As the free store location arising when information is read from the last section $F_n$ of the shift register $R_1$ requires a given period of time for being shifted back to the first section $F_1$, this maximum storage capacity is smaller than the storage capacities corresponding to the total number of sections $n$ of the shift register $R_1$.

The maximum variation of the storage capacity of the buffer unit B is the difference between the maximum and the minimum storage capacity, which amounts to the value of $$(1 - f_{in} + f_u/f_{CL}) \cdot n \text{ bits} \quad (9)$$

, rounded off to an integral number. As $f_{in}$ is approximately equal to $f_u$, this becomes $$(1 - 2f_{in}/f_{CL}) \cdot n \text{ bits.} \quad (10)$$

For a buffer unit which was realized in practice and which comprises a shift register having 100 sections, where $f_{in} = f_u = 2$ MHz was chosen, the storage capacity of 10 MHz, and 80 bits at a clock pulse frequency $f_{CL}$ of 20 MHz. This demonstrates that the clock pulse frequency $f_{CL}$ of the clock pulses $cl_l$ should preferably amount to 5 to 10 times the clock frequency of the information to be buffered.

Figure 2A:
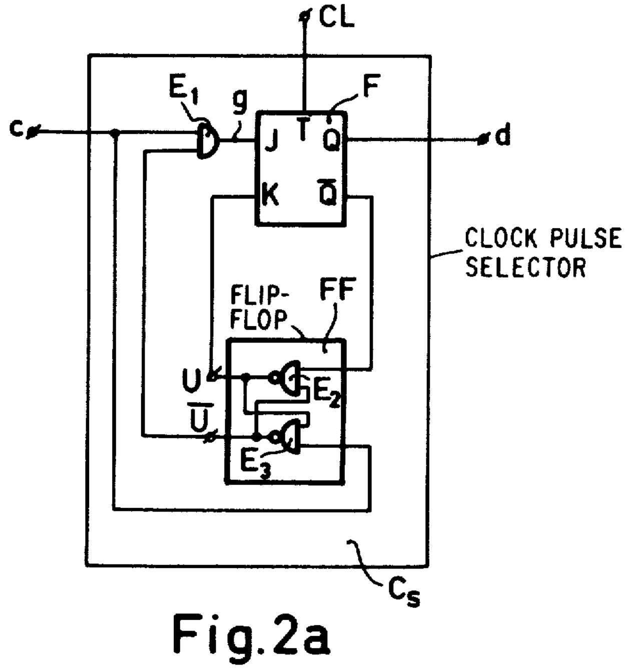
FIG. 2*a* is a detailed view of a clock pulse selector of the buffer unit according to the embodiment shown in FIG. 1.

In order to ensure that during the time that an information bit is present on the information input terminals $p_1$, $p_2$ of the shift register $R_1$ the bistable element $F_1'$ is set once to the position "1" for at the most one clock pulse period of the clock pulse frequency $f_{CL}$ or, immediately after the instant that an information is read from the information output terminals $p_3$ and $p_4$ of the shift register $R_1$, the bistable element $F_n'$ is set once to the position "0" for at the most one clock pulse period of the clock pulse frequency $f_{CL}$, clock pulse selectors $C_{si}$ and $C_{su}$ are provided as is shown in FIG. 1. These clock pulse selectors $C_{si}$ and $C_{su}$ have a supply terminal $c_i$ and $c_u$, respectively, for receiving the clock pulses of the information to be written in and read out, respectively, and are connected to the clock pulse connection terminal CL for supplying clock pulses $cl_l$ thereto, and to an output terminal $d_i$ and $d_u$, respectively. The diagram of a clock pulse selector of this kind is shown in FIG. 2a and is denoted by $C_s$. The clock pulses of the information to be written in or read out are applied to the terminal $c$ and clock pulses $cl_l$ are applied to the terminal CL. The terminal CL is connected to the control terminal T of a J-K flipflop F. As is known and as can be readily verified by means of (1), when the values "1" and "0" are applied to the inputs J and K of a J-K flipflop, the value of the output Q becomes "1," independent of the value of Q prior to the appearance of a clock pulse on control terminal T, after the appearance of a clock pulse. Analogously, the value of the output Q becomes "0" after the appearance of a clock pulse when the values "0" and "1" are applied to the inputs J and K, independent of the value of Q prior to the appearance of a clock pulse. This property of a J-K flipflop is used to derive a pulse having a duration which is equal to one pulse period of the clock pulses $cl_l$ from each pulse of the pulse sequence applied to terminal $c$. For applying the desired signal values of the input terminals J and K of the J-K flipflop F, the clock pulse selector $C_s$ comprises an AND-gate $E_1$ and a flipflop FF. The flipflop FF comprises two NAND-gates $E_2$ and $E_3$, respectively, the outputs U and $\bar{U}$, respectively, of which are connected to one of the inputs of the NAND-gates $E_3$ and $E_2$, respectively. The output $\bar{U}$, connected to an input of the AND-gate $E_1$, determines whether the pulses applied to the input terminal $c$ are applied to the input J of the J-K flipflop F. For this purpose, the terminal $c$ is connected to the other input of the AND-gate $E_1$, said AND-gate $E_1$ being connected to the input J of the J-K flipflop F via conductor $g$. The output U of the flipflop FF is connected to the input K of the J-K flip-flop F. The flipflop circuit FF is controlled on the one hand by the signal value of the output $\bar{Q}$ of the J-K flipflop F, the said terminal $\bar{Q}$ being connected to the other input of the NAND-gate $E_2$ for this purpose, and on the other hand by the pulses applied to terminal $c$, said terminal $c$ being connected to the other input of the NAND-gate $E_3$ for this purpose.

Figure 2B:
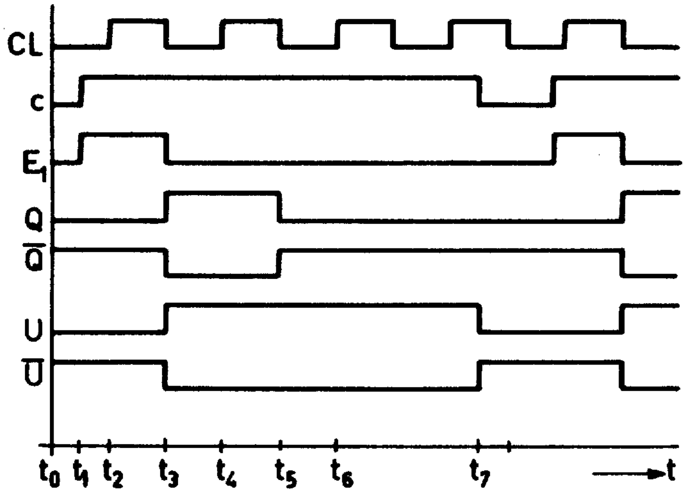
FIG. 2*b* shows a graph of the signals occurring in the clock pulse selector shown in FIG. 2*a*.

The operation of the selector $C_s$ will be described in detail with reference to the graph shown in FIG. 2b. It is assumed that at an instant $t_0$ the output $\bar{U}$ of the flipflop FF and the output $\bar{Q}$ of the J-K flipflop F have the value "1." If a clock pulse of the information to be written in or read out is received on terminal $c$ at instant $t_1$, AND-gate $E_1$, to both inputs of which a signal of the value "1" is then applied, will apply a signal of the value "1" to the input J of the J-K flipflop F. A signal of the value "0" is applied to the input K of the J-K flipflop F. During the positive period of a clock pulse, the master storage element of the J-K flipflop F is set, the clock pulse appearing at the instant $t_2$ as is shown in the figure. The slave storage element of the J-K flipflop F is set upon the appearance of the trailing edge of the clock pulse at the instant $t_3$. The signal value of the output signal on the output terminal Q of the J-K flipflop F then becomes "1," so the value of the signal on the output $\bar{Q}$ becomes "0." The signal value variation on the output $\bar{Q}$ causes the flipflop FF to be changed over, so that the output U supplies a signal of the value "1" and the output $\bar{U}$ supplies a signal of the value "0." The signal of the value "0" of the output $\bar{U}$ blocks the AND-gate $E_1$, so that the signal value "0" is applied to the input J of the J-K flipflop F. A signal of the value "1" is applied to the input K of the J-K flipflop F via the output U. The next leading edge of the clock pulse signal occurring at the instant $t_4$ resets the master storage element and the trailing edge occurring at the instant $t_5$ resets the slave storage element. At this instant the signal value of the output Q of the J-K flipflop F becomes "0" and the signal value of the output $\bar{Q}$ becomes "1." The signal value "1" of the output $\bar{Q}$ has no effect on the state of the flipflop FF as the latter changes over only if an input changes over from the signal value "1" to "0." Consequently, the applied signal values "0" and "1" prevail on the inputs J and K of the J-K-flipflop F, so that the next clock pulses appearing will not change the state of the J-K flipflop. The flipflop FF is reset only if the pulse on input terminal $c$ returns to the signal value "0," as is the case at instant $t_6$, via the other input of the NAND-gate $E_3$. The AND-gate $E_1$, however, continues to apply a signal value "0" to the input J of the J-K flipflop F because a signal of the value "0," originating from input terminal $c$, is applied to the other input. As a signal of the value "0" is applied to both input terminals J and K, the J-K flipflop F is fixed in the reset state as can be readily deduced from formula (1). The clock pulse selector $C_s$ has returned to its starting position, as indicated at the instant $t_0$, at the instant $t_7$. As appears from the foregoing description, a pulse appears once on the output terminal which is connected to output Q of the J-K flipflop F after a pulse has been applied to the input $c$ under the control of the subsequent clock pulse $cl_i$, the former pulse having a duration amounting to one period of the clock pulse $cl_i$ as is required.

Figure 3:
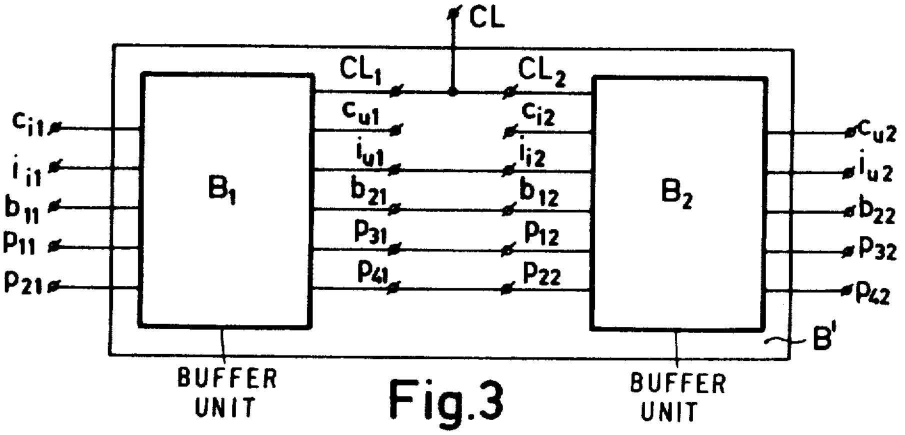
FIG. 3 shows an embodiment of two series-connected buffer units according to FIG. 1.

If a buffer unit having a very large storage capacity variation is required, it can be readily constructed by connecting various buffer units B in series as is shown in FIG. 3. For this purpose the OR-gates $O_1$ and $O_2$ are provided, as is shown in FIG. 1. The output $d_i$ of clock pulse selector $C_{si}$ and an input terminal $i_i$ are connected to the inputs of the OR-gate $O_1$. The output terminal of this OR-gate is connected to the input J of the bistable element $F_1'$. The output $d_u$ of the clock pulse selector $C_{su}$ and an output terminal $b_2$ are connected to the inputs of the OR-gate $O_2$. Also provided are an input terminal $b_1$ which is connected to the $\bar{Q}$ output of bistable element $F_1'$, and an output terminal $i_u$ which is connected to the Q output of element $F_n'$.

In the series connection of a first and a second buffer unit as shown in FIG. 3, all elements of the first buffer unit are denoted by an extra index 1 and the elements of the second buffer unit are denoted by an extra index 2. By connecting, as shown in FIG. 3, the information output terminals $p_{31}$ and $p_{41}$ of a shift register $R_{11}$ not shown to the information input terminals $p_{12}$ and $p_{22}$ of a shift register $R_{12}$ not shown, one shift register R, not shown in the figure, is obtained having a storage capacity which is equal to the sum of the storage capacities of the shift register $R_{11}$ and $R_{12}$. In order to obtain a bookkeeping register R', not shown in the figure, for the shift register R, the output terminals $i_{u1}$ of a bookkeeping register $R_{21}$ not shown and terminals $b_{21}$ are connected to the input terminals $i_{i2}$ of the bookkeeping register $R_{21}$ not shown and terminal $b_{12}$.

The clock pulses of the information to be written in or read out are applied to the terminals $c_{i1}$ and $c_{u2}$, respectively, of clock pulse selectors $C_{si1}$ and $C_{su2}$ not shown. No signals are applied to the terminals $c_{u1}$ and $c_{i2}$ of clock pulse selectors $C_{si1}$ and $C_{si2}$ not shown, so that the outputs $d_{i2}$ and $d_{u1}$ apply a signal of the value "0" to OR-gates $O_{21}$ and $O_{12}$, respectively, not shown, so that the flow of signal values occurring in the bookkeeping register R' is not disturbed. The clock pulse connection terminals $CL_1$ and $CL_2$ are interconnected and connected to clock pulse connection terminals $C_l$ for applying clock pulse $cl_l$ to the clock pulse inputs T of the bistable elements F' of bookkeeping registers $R_{21}$ and $R_{22}$ not shown.

It is to be noted that it is alternatively possible to buffer word-organized information. For this purpose, each section F of the shift register $R_1$ of the embodiment shown in FIG. 1 is provided with a number of J-K flipflops F, said number being equal to the number of bits per word of the word-organized information. The control terminals T of the bistable elements $F_g$ ($g$=1 . . . $n$) of a section of the shift register $R_1$ are connected to the $\bar{Q}$ output of the bistable element $F_g'$ associated with these sections F. In that case the input terminal $c_i$ of the clock pulse selector $C_{si}$ and the input terminal $c_u$ of the clock pulse selector $C_{su}$ are to be supplied with pulse sequences which are derived from the word frequency of the information to be written in or read out.

What is claimed is:

1. A buffer unit module for a synchronous buffer assembly using a plurality of serially connected buffer units to convey information signals from an information source to an information receiver each operating at a slightly different frequency; comprising input terminal means for receiving information signals having a given frequency; first clock pulse terminal means for receiving information clock pulses at the frequency of the information signals; second clock pulse terminal means for receiving local clock pulses at $n$ times the frequency of the information signals, where $n$ is an interger greater than 1; third clock pulse terminal means for receiving clock pulses at the frequency of the information receiver; information signal output terminal means; a shift register comprising $n$ serially connected clocked bistable multivibrators, each of the multivibrators having an information input, a clock input and an information output, each multivibrator providing an output signal on the information output thereof corresponding to the signal on the information input thereof in response to a pulse on the clock input thereof; means connecting the information input of the first multivibrator of the series to the input terminal means of the buffer unit; means connecting the information output of the last multivibrator of the series to the information output terminal means of the module; a bookkeeping register comprising n serially connected J-K flipflops, each J-K flipflop having a J input, a K input, a clock pulse input, a Q output and a $\bar{Q}$ output, the serial connection between flipflops of the bookkeeping register comprising means for connecting the Q output of each but the last J-K flipflop in the series to the J input of the next succeeding J-K flipflop in the series and means connecting the $\bar{Q}$ output of each but the first J-K flipflop in the series to the K input of the preceeding J-K flipflop in the series; means connecting the $\bar{Q}$ output of each J-K flipflop in the bookkeeping register to the clock input of the corresponding bistable multivibrator in the shift register; first clock pulse selection means connected to the first and second clock pulse terminals of the unit for providing a single output pulse having a pulse width equal to 1 period of the local clock pulses in response to a pulse of the information clock pulses;

means connecting the output pulse of the first pulse selection means to the J input of the first J-K flipflop in the bookkeeping register; a second clock pulse selection means connected to the second and third clock pulse terminals of the unit for providing a single output pulse having a pulse width equal to 1 period of the local clock pulses in response to a pulse from the receiver clock pulses; an interunit bookkeeping input terminal; a first OR-gate having an output connected to the J input of the first J-K flipflop in the bookkeeping register; means connecting the output pulse of the first clock pulse selection means and the intermediate bookkeeping input terminal to the inputs of the first OR-gate, whereby the bookkeeping register receives input signals from the information clock pulse terminal through the first clock pulse selection means if the buffer unit is the first unit in the buffer assembly, and whereby the bookkeeping register receives input signals from the interunit bookkeeping input terminal if the buffer unit is connected to the information source through other buffer units; an interunit feedback output terminal connected to the $\bar{Q}$ output of the first J-K flipflop in the bookkeeping register; an interunit feedback input terminal; a second OR-gate having an output connected to the K input of the last J-K flipflop in the bookkeeping register; means connecting the output pulse of the second clock pulse selection means and the interunit feedback input terminal to inputs of the second OR-gate, whereby the last stage of the bookkeeping register receives an input from the clock pulses of the information receiver through the second clock pulse selection means if the buffer unit in the buffer assembly is directly connected to the information receiver and whereby the last stage of the bookkeeping register receives an input from the interunit feedback input terminal if the buffer unit is connected to the information receiver through another buffer unit; and an interunit bookkeeping output terminal connected to the $\bar{Q}$ output of the last stage of the bookkeeping register.

* * * * *

PO-1050
(5/69)

UNITED STATES PATENT OFFICE

CERTIFICATE OF CORRECTION

Patent No. 3,745,535 Dated July 10, 1973

Inventor(s) OSCAR B.P.R. DEKOE and ARNOLD JAN BIJKER

It is certified that error appears in the above-identified patent and that said Letters Patent are hereby corrected as shown below:

Col. 3, line 34, after "$R_1$" insert --are--;

line 50, after "in" insert --. A--;

Col. 7, line 48, before "of" insert --variation was 60 bits at a clock pulse frequency $f_{CL}$--;

Signed and sealed this 27th day of November 1973.

(SEAL)
Attest:

EDWARD M.FLETCHER,JR.
Attesting Officer

RENE D. TEGTMEYER
Acting Commissioner of Patents